US010475466B2

(12) United States Patent
Charette et al.

(10) Patent No.: US 10,475,466 B2
(45) Date of Patent: Nov. 12, 2019

(54) ADAPTIVE VEHICLE STATE-BASED HANDS-FREE PHONE NOISE REDUCTION WITH LEARNING CAPABILITY

(71) Applicant: Ford Global Technologies, LLC, Dearborn, MI (US)

(72) Inventors: Francois Charette, Canton, MI (US); Anthony Dwayne Cooprider, Rochester Hills, MI (US); Paul J Joseph Nicastri, Royal Oak, MI (US); Yuksel Gur, Ann Arbor, MI (US); Scott Andrew Amman, Milford, MI (US); Gintaras Vincent Puskorius, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 197 days.

(21) Appl. No.: 14/334,627

(22) Filed: Jul. 17, 2014

(65) Prior Publication Data

US 2016/0019904 A1    Jan. 21, 2016

(51) Int. Cl.
| | | |
|---|---|---|
| *G10L 21/0208* | (2013.01) | |
| *G10L 21/02* | (2013.01) | |
| *G10L 25/93* | (2013.01) | |
| *G10L 25/48* | (2013.01) | |

(Continued)

(52) U.S. Cl.
CPC ...... *G10L 21/0208* (2013.01); *G10L 21/0205* (2013.01); *G10L 25/48* (2013.01); *G10L 25/60* (2013.01); *G10L 25/93* (2013.01); *G10L 2021/02085* (2013.01); *H04M 1/6075* (2013.01)

(58) Field of Classification Search
None
See application file for complete search history.

(56) References Cited

U.S. PATENT DOCUMENTS

| | | | |
|---|---|---|---|
| 7,941,189 B2 | 5/2011 | Miyauchi | |
| 8,612,222 B2 | 12/2013 | Hetherington et al. | |
| 8,666,736 B2 | 3/2014 | Haulick et al. | |

(Continued)

FOREIGN PATENT DOCUMENTS

| | | |
|---|---|---|
| CN | 103208287 A | 7/2013 |
| DE | 10311587 A1 | 9/2004 |

(Continued)

OTHER PUBLICATIONS

Jean Pierre Jallet, The fully Networked Car, Mar. 4-5, 2009, Geneva; pp. all.*

(Continued)

*Primary Examiner* — Richa Mishra
(74) *Attorney, Agent, or Firm* — Frank Lollo; Eversheds Sutherland (US) LLP

(57) ABSTRACT

This disclosure generally relates to a system, apparatus, and method for achieving an adaptive vehicle state-based hands free noise reduction feature. A noise reduction tool is provided for adaptively applying a noise reduction strategy on a sound input that uses feedback speech quality measures and machine learning to develop future noise reduction strategies, where the noise reduction strategies include analyzing vehicle operational state information and external information that are predicted to contribute to cabin noise and selecting noise reducing pre-filter options based on the analysis.

18 Claims, 4 Drawing Sheets

(51) Int. Cl.
*G10L 25/60* (2013.01)
*H04M 1/60* (2006.01)

(56) References Cited

U.S. PATENT DOCUMENTS

| | | | |
|---|---|---|---|
| 2002/0097884 A1* | 7/2002 | Cairns | G10K 11/178 |
| | | | 381/71.4 |
| 2003/0236672 A1 | 12/2003 | Aaron et al. | |
| 2004/0142672 A1 | 7/2004 | Stankewitz | |
| 2008/0159559 A1* | 7/2008 | Akagi | G10L 21/0208 |
| | | | 381/92 |
| 2008/0188271 A1 | 8/2008 | Miyauchi | |
| 2008/0200209 A1* | 8/2008 | Cahoon | B60R 25/045 |
| | | | 455/557 |
| 2009/0030679 A1* | 1/2009 | Chengalvarayan | G10L 15/20 |
| | | | 704/233 |
| 2011/0218801 A1 | 9/2011 | Vary et al. | |
| 2011/0255702 A1 | 10/2011 | Jensen | |
| 2013/0185066 A1* | 7/2013 | Tzirkel-Hancock | G10L 15/20 |
| | | | 704/233 |
| 2013/0185078 A1* | 7/2013 | Tzirkel-Hancock | G10L 15/22 |
| | | | 704/275 |
| 2013/0260692 A1 | 10/2013 | Hera | |
| 2014/0274211 A1* | 9/2014 | Sejnoha | H04M 1/72519 |
| | | | 455/563 |
| 2014/0277939 A1 | 9/2014 | Liu et al. | |
| 2014/0278383 A1* | 9/2014 | Fan | G10L 25/84 |
| | | | 704/224 |
| 2015/0127351 A1 | 5/2015 | Buck et al. | |

FOREIGN PATENT DOCUMENTS

| | | |
|---|---|---|
| JP | 2003344083 A | 12/2003 |
| JP | 2008239099 | 10/2008 |
| JP | 2008239099 A * | 10/2008 |

OTHER PUBLICATIONS

Jean Pierre Jallet, The fully Networked Car, Mar. 4-5, 2009, Geneva; pp. all (Year: 2009).*
Parrot CK3100 LCD, Feb. 2010.
The Fully Networked Car, Jean-Pierre Jallet, Mar. 4, 2009.
Class Noise Vs. Attribute Noise: A Quantitative Study of Their Impacts, Xingquan Zhu & Xindong Wu, 2004, p. 177-210.
Chinese Office Action dated Feb. 3, 2019 for Chinese Patent Application No. 201510416175.5 (7 pages).

* cited by examiner

ADAPTIVE VEHICLE STATE-BASED HANDS-FREE PHONE NOISE REDUCTION WITH LEARNING CAPABILITY

TECHNICAL FIELD

This disclosure generally relates to a system, apparatus, and method for achieving an adaptive vehicle state-based hands free noise reduction feature. This noise reduction feature may be implemented as part of a vehicle's hands-free phone system that allows a user to link up their communications device (e.g., Smartphone) to the vehicle in order to operate a telephone conversation.

BACKGROUND

For both safety and convenience reasons, hands free audio systems have become popular to include within a vehicle's cabin. Such hands free audio systems may be implemented within the vehicle's cabin to allow a user (e.g., driver or passenger) to speak verbal commands for controlling certain vehicle components, or to communicate with others through a communications network connection.

In order to be effective, it is important that the user's speech is clearly detectable from other noises that may be received by a microphone component of the hands free audio system responsible for receiving the user's speech.

SUMMARY

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

Exemplary embodiments provide a noise reduction tool configured to provide a noise reduction feature to a sound input received by a microphone within a vehicle's cabin in order to better detect a user's speech from the sound input. More specifically, the noise reduction tool may apply specific noise reduction pre-filters to reduce noise in the sound input caused by vehicle components and/or other external factors that are known to be operating or present while the sound input is being received by the microphone. Further, the noise reduction tool is configured to adaptively adjust the application of a pre-filter based on the noise reduction performance of the pre-filter in a previous implementation. It follows that the noise reduction tool is configured to provide an adaptive learning feature for improving the noise reduction of a received sound input based on the application of one or more pre-filters.

According to some embodiments, an apparatus for adaptively achieving noise reduction on a sound input is provided. The apparatus may include an apparatus, comprising: a memory configured to store one or more noise reduction pre-filters and feedback data based on a previous noise reduction strategy; and a processor in communication with the memory. The processor may be configured to: receive a sound input; receive training input data; receive the feedback data; select one or more noise reduction pre-filters based on the training input data and feedback data, and apply the selected noise reduction pre-filters to the sound input.

According to some embodiments, a method for adaptively achieving noise reduction on a sound input is provided. The method may comprise: storing, in a memory, one or more noise reduction pre-filters and feedback data based on a previous noise reduction strategy; receiving the sound input; receiving training input data; receiving the feedback data; selecting one or more noise reduction pre-filters based on the training input data and feedback data, and applying the selected noise reduction pre-filters to the sound input.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

Figure 1:
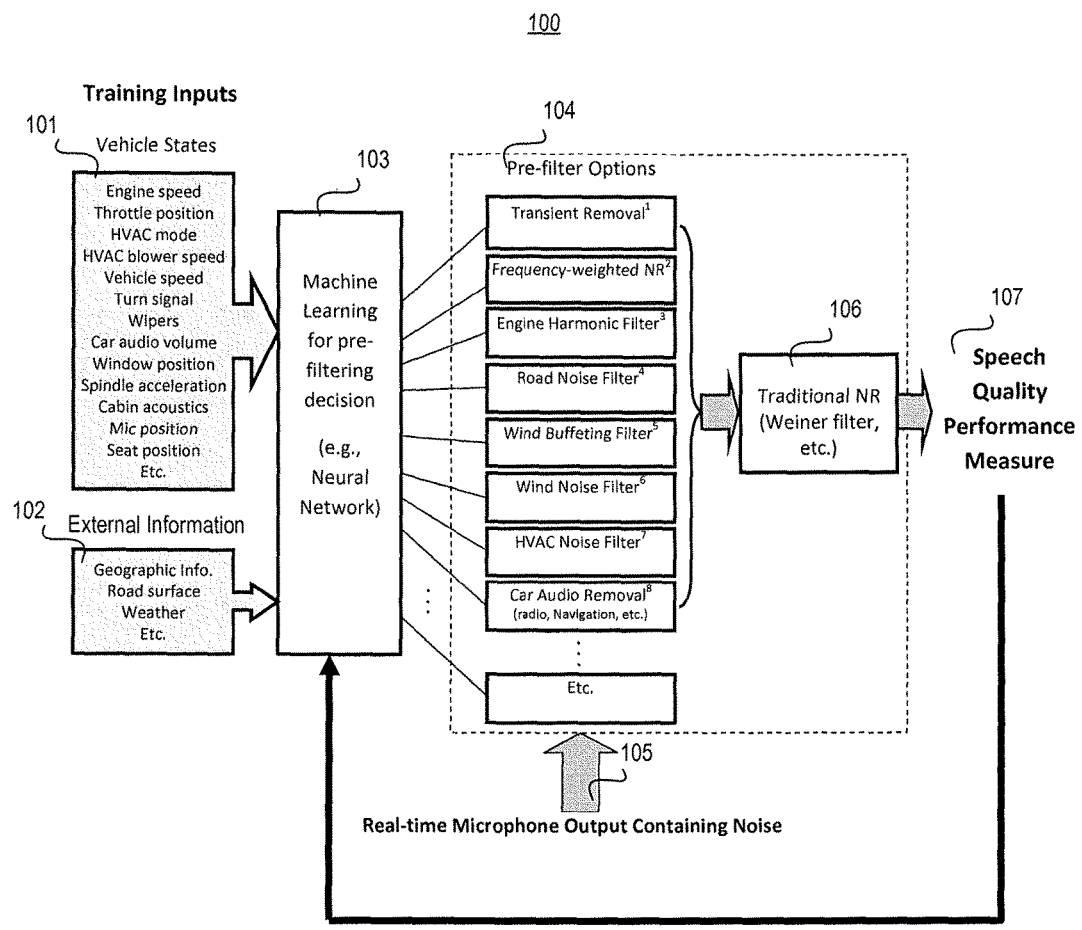
FIG. 1 illustrates an exemplary block diagram describing a process for achieving noise reduction according to some embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

A hands free audio system implemented as part of a vehicle's overall vehicle system may be comprised of a speech command system configured to receive a user's speech command input, recognize a command from the user's speech command input, and control a vehicle component or feature based on the recognized command from the user's speech command input. A hands free audio system implemented as part of the vehicle's overall vehicle system may also be comprised of a hands free phone system configured to link with a communication device (e.g., smart phone that is linked to the hands free phone component, or a telecommunications component that is part of the vehicle) in order to receive a user's speech input via a microphone within the vehicle cabin and/or on the communication device, communicate the user's speech input to another communication device, receive an external user's speech input from the other communication device, and output the external user's speech input through one or more speakers included in the vehicle cabin for the user to hear within the vehicle.

The speech command system and hands free phone system are just two examples of a hands free audio system that may be implemented within a vehicle that may utilize the noise reduction features described herein. However, for purposes of simplifying the description provided herein, the hands free audio system will be described in terms of being the hands free phone system. Even so, it should be noted that other types of hands free audio systems are also contemplated as being within the scope of the innovation described herein.

A hands free phone system may operate to allow a user within the vehicle to connect a phone (e.g., Smartphone capable of wirelessly, or via wire, link to the vehicle's hands free phone system) to the hands free phone system and make a call to another phone via a telecommunications network. The connection of the hands free phone system to the phone may be in accordance to any one or more standards that include, for example, Bluetooth, Near Field Communication (NFC), WiFi (wireless fidelity), or other communications network may be used. In addition to the wireless connection protocols described, the hands free phone system may also connect with the phone via a wired connection.

Connecting the phone to the vehicle's hands free phone system is advantageous because it allows the user to utilize a microphone within the vehicle cabin to pick up the user's speech input, and also utilize speakers within the vehicle cabin to output a speech input received from the other end of the call communication. In this way, the user is not required to physically hold the phone to the user's mouth and ears, as the vehicle's microphone and speakers take the place of the phone's microphone and speakers. This provides the user with the advantage of not being distracted with holding and operating the phone while driving the vehicle, or otherwise being a passenger within the vehicle. It should be noted that although this disclosure describes a phone as connecting to the vehicle's hands free phone system, this is provided for exemplary purposes. It is within the scope of the innovation described herein to have the hands free phone system connect to other types of communication devices that are capable of communication through a communications network. For example, a laptop computer, tablet computing device, personal digital assistant (PDA), or other computing device capable of communicating with another communication device via a communication network may be used.

Although the hands free phone system offers the benefit of freeing up the user's hands from operating a communications device, the hands free phone system still engages in efforts to achieve a high quality call conversation with minimal noise interference. This is because the vehicle cabin from which a microphone of the hands free phone system picks up the user's speech input may be a noisy environment. For example, the vehicle cabin may be infiltrated with noises originating from various vehicle components that are operating during a call conversation. In addition, other external factors may also contribute to the noise that infiltrates the vehicle cabin. Therefore the sound input picked up by the cabin microphone may be comprised of the user's speech, as well as noise from various sources. It follows that it is a goal to recognize a source of a noise picked up by the cabin microphone within the vehicle cabin, identify a noise reduction pre-filter corresponding to the recognized noise source, and apply the noise pre-filter to the sound input picked up by the cabin microphone in order to reduce, at least in part, the noise within the sound input that may interfere with the user's actual speech.

In order to achieve this goal of noise reduction for a vehicle's hands free audio system, a noise reduction tool may be utilized. The noise reduction tool may be a program, application, and/or some combination of software and hardware that is incorporated on one or more of the components that comprise the vehicle's operating system. Further description for the noise reduction tool and the components of the vehicle's system running the noise reduction tool is described in more detail below.

FIG. 1 discloses a block diagram 100 that describes information received by the noise reduction tool, information analyzed by the noise reduction tool, information generated by the noise reduction tool according to some embodiments, and operational blocks. The block diagram 100 is understood to be an implementation of the noise reduction tool running on one or more vehicle components that comprise the vehicle system, and more specifically that comprise the hands free phone system described herein. The hands free phone system may be a combination of hardware, software, and vehicle components that allow the noise reduction tool to accomplish the goal of reducing, at least in part, the noise in a sound input picked up by the vehicle's cabin microphone, where the noise is recognized to be caused by known vehicle components and/or known external factors. An exemplary embodiment of the hands free phone system may include the noise reduction tool, a processor configured to execute instructions stored on a memory corresponding to the noise reduction tool, the memory storing the instructions corresponding to the noise reduction tool, one or more microphones for picking up a sound input from the vehicle cabin, an interface for communication with an external server, and an interface for communication with the user's phone. The hands free phone system described is provided for exemplary purposes only, as it is within the scope of the innovation described herein to include a fewer, or greater, number of components to the hands free phone system in other embodiments.

As described above, the vehicle cabin may be infiltrated by noise caused by various vehicle components. For example, many vehicle components involve moving parts that cause sounds that eventually infiltrate the vehicle cabin. Other noises that infiltrate the vehicle cabin may be caused by external factors such as wind, tires rolling on a road surface, or other passengers in the vehicle cabin. In any case, such sounds that infiltrate the vehicle cabin may later contribute to background noise in a sound input picked up by the cabin microphone during a call conversation being implemented by the hands free phone system. It follows that the noise reduction tool looks to accurately reduce, at least in part, the noise caused by the known operation of specific vehicle components, as well as the noise caused by known external factors, in order to more clearly understand the user's speech within the sound input.

In terms of the noise caused by the operation of specific vehicle components, a sound profile may be generated that approximately describes a sound received by the cabin microphone due to the operation of a specific vehicle component. Based on this sound profile, a corresponding pre-filter may be developed that serves to reduce, at least in part, the noise picked up by the cabin microphone due to the specific vehicle component. Similar pre-filters may be developed for one or more vehicle components that are known to contribute to sounds into the vehicle cable that may later be picked up by the cabin microphone as noise to a user's speech. A collection of the pre-filters may be stored as part of a pre-filter database on a memory unit of the hands free phone system.

It follows that block 101 in FIG. 1 describes a check done by the noise reduction tool that detects an operational state for one or more vehicle components. The vehicle operational state information 101 may identify whether a vehicle component is on or off, or operating in one of a variety of available states available for the vehicle component.

For example, an operational state for a turn signal component may identify the turn signal component as being either in an on or off state, where the clicking noise from the turn signal may contribute to cabin noise.

In addition, an operational state of the engine may identify a current engine speed (e.g., measured in revolutions per minute), where the engine is known to make specific known sounds within the vehicle cabin at different engine speeds.

In addition, an operational state of the throttle position may correlate to a current engine speed or vehicle speed, where the engine is known to make specific known sounds within the vehicle cabin at different engine speeds and/or vehicle speeds that may be identifiable based on the throttle position.

In addition, an operational state for a heating and ventilation and air conditioning (HVAC) system may identify whether heating or air conditioning is activated, where the HVAC system operating under heating operations may be known to create specific known sounds within the vehicle cabin and the HVAC system operating under air conditioning operations may be known to create specific known sounds within the vehicle cabin.

In addition, an operational state for an HVAC blower may identify a speed at which the HVAC blower is operating, where the HVAC blower is known to have different sounds within the vehicle cabin at different blower operational speeds.

In addition, an operational state for a wiper component may identify a speed at which the wiper component is operating, where the wiper component is known to have a specific sound within the vehicle cabin at different wiper operational speeds.

In addition, an operational state for a car audio system may identify a sound output being output by the car audio system such that a pre-filter may be generated and applied for reducing, at least in part, the sound output caused by the car audio system within the vehicle cabin. More specifically, an operational state for a car audio system may also identify a volume at which the car audio system is operating, where the car audio system is known to contribute to specific sounds at specific frequencies within the vehicle cabin at different sound volumes. It follows that a pre-filter may be generated and applied for reducing, at least in part, the sound output caused by the car audio system within the vehicle cabin, and in some embodiments, additionally compensate for the known volume of the car audio system output.

In addition, an operational state for windows may identify a window open position for one or more windows of the vehicle, where the window open position is known to contribute a specific sound into the vehicle cabin.

In addition, an operational state for a spindle accelerometer may identify an acceleration detected by a spindle of the spindle accelerometer, where the acceleration of the spindle may identify the presence of road impacts by the vehicle, where road impacts are known to cause specific sounds to infiltrate the vehicle cabin.

In addition, an operational state for cabin acoustics may identify characteristics of the vehicle cabin that may affect cabin noise. For example, the operational state may identify different cabin acoustic characteristics, such as number of occupants, interior surface materials, etc., that are known to affect cabin noise in specific ways and instances.

In addition, an operational state may identify the position for cabin microphones which may be referenced during the machine learning stage 103. For example, the position of the cabin microphone may affect how the cabin microphone picks up different sounds (e.g., user's speech input and cabin noise) as different positions may be closer to certain sound sources while further away from other sound sources. It follows that the operation state that identifies the cabin microphone positions may correspond to known affects on how different sounds sources will be picked up by the cabin microphone.

In addition, an operational state may identify seat position for the driver and/or passengers of the vehicle which may be referenced during the machine learning stage 103. For example, the seat position may affect a distance of the user from the cabin microphone, where the user is responsible for producing the user speech in the sound input to the cabin microphone. Therefore, by changing the seat position for the user, the user's speech input may be affected, which in turn may affect the overall sound input that includes the sound profile for cabin noise. It follows that the seat position identified by the operational state may correspond to a known effect on how the cabin microphone is able to pick up the user's speech input and/or cabin noise.

The vehicle operational state information described herein are provided for exemplary purposes only, as a greater, or fewer, number of vehicle operational state information may be available to the noise reduction tool.

Further, the noise reduction tool may receive external information 102 that identifies potential sources of noise sounds that may infiltrate the vehicle cabin. The external information 102 may include geographic information obtained from a global positioning system (GPS) for a route being traveled by the vehicle, where the geographic information may include geographic conditions that may contribute noise into the vehicle cabin. The external information 102 may also include road surface information for a road being traveled on by the vehicle. The road surface information may identify a type of road surface such as gravel, highway, asphalt, concrete, dirt, slick, or other identifiable road surface type, where the different road surface types are known to contribute different noises into the vehicle cabin due to tire-to-road contact. In addition, the external information 102 may include weather information that identifies weather conditions (e.g., rain, snow, hail, thunder, lightening, or other weather condition that may contribute to noise into the vehicle cabin) that may contribute to noise into the vehicle cabin.

Figure 2:
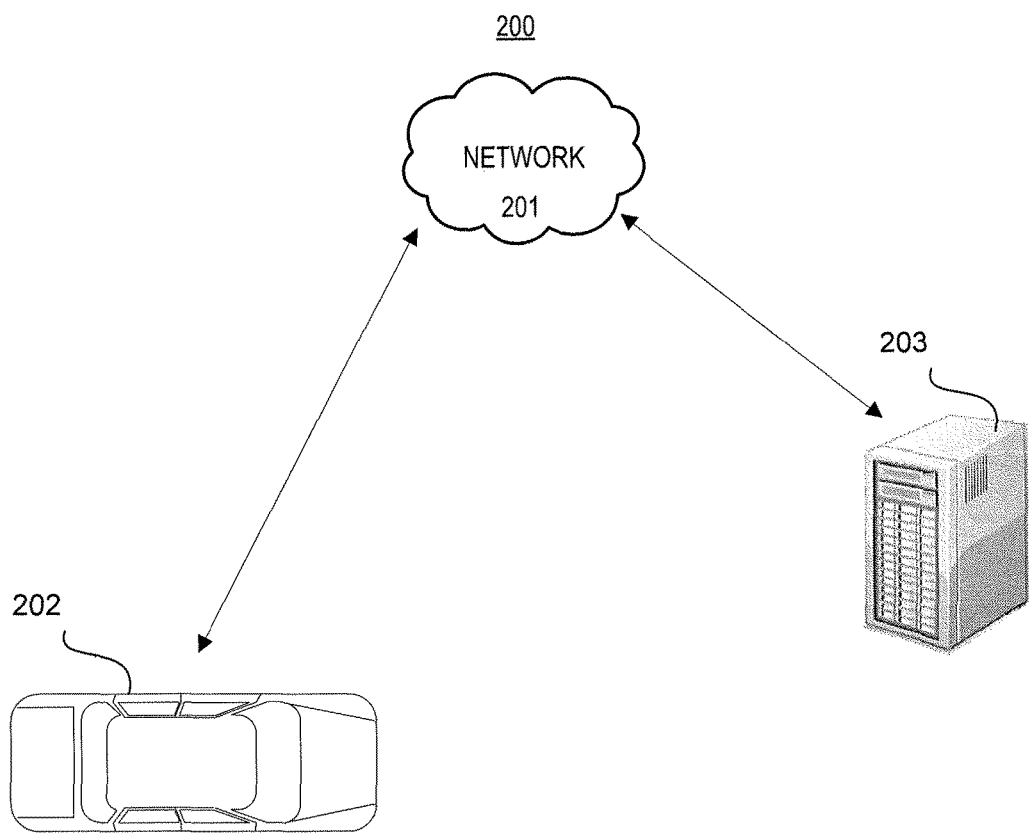
FIG. 2 illustrates an exemplary system for obtaining information according to some embodiments.

In some embodiments the obtained external information 102 may be received from an external information server 203 as illustrated in FIG. 2. FIG. 2 illustrates an exemplary network system 200 comprised of the vehicle 202 (e.g., the vehicle described herein), a network 201, and an information server 203. The information server 203 may represent one or more external servers that store one or more of the external information 102 described herein. The noise reduction tool may be running on the vehicle 202 such that the noise reduction tool may control a communications interface of the vehicle system to communicate with the information server 203 via the network 201. The noise reduction tool may control a request for the external information 102 to be transmitted to the information server 203 via the network 201. In response, the information server 203 may receive the request and transmit, via the network 201, one or more of the requested external information 102 back to the vehicle 202 to be received by the communications interface of the vehicle 202. Once the external information 102 is received and stored on a storage unit (i.e., memory) of the vehicle system, the noise reduction tool may then access the external information 102 as illustrated in FIG. 1.

The external information 102 described herein are provided for exemplary purposes only, as a greater, or fewer, number of external information options may be available to the noise reduction tool.

It follows that vehicle operational state information 102 may be received by the noise reduction tool that identifies the operational state for one or more vehicle components that may be operational and may contribute noise into the vehicle cabin. The noise reduction tool may also receive external information 102 that identifies one or more external information that may contribute noise into the vehicle cabin. The noise reduction tool may also receive speech quality measurement information. Together, the vehicle operational state information 101 and external information 102 may comprise training inputs for training the machine learning described below in order to develop the pre-filter selection strategy at 103. The training inputs may be information that identifies vehicle components or other sources that are predicted to contribute to cabin noise.

After receiving the vehicle operational state information 101, and receiving the external information 102, the noise reduction tool may apply a pre-filter selection strategy at 103. The pre-filter selection strategy may be the result of a machine learning training operation that develops a strategy for selecting pre-filters based on previously achieved speech quality performance in view of previous applications of pre-filter combinations in light of previously identified training inputs. Therefore, the machine learning training may be an analysis based on a combination of one or more of past vehicle state information, past microphone sound information, past speech quality performance measurement data, or previously received external information. The machine learning process itself may be in accordance to known techniques such as decision tree learning, clustering, neural networks, or other similarly applicable machine learning technique.

Initially, the machine learning training may be implemented on an external computing device (i.e., not part of the onboard computing system on the vehicle) during an off-line training period, wherein the resulting pre-filter selection strategy may be pre-loaded onto a computing system of the vehicle as part of the noise reduction tool as illustrated by the pre-filter selection strategy at 103. Following the loading of the initial pre-filter selection strategy, subsequent instances of the machine learning may be implemented at 103 by the noise reduction tool running on the vehicle to develop updated pre-filter selection strategies.

The pre-filter selection strategy applied at 103 is implemented in order to determine which pre-filters from the database of pre-filter options at 104 will be applied to the sound input 105 received by the cabin microphone. For instance, applying all of the pre-filters that correspond to operational vehicle components based on the vehicle operational state information 101 and received external information 102 may not result in the clearest noise reduction of the sound input received by the cabin microphone. In some embodiments, not all pre-filters corresponding to predicted cabin noise source candidates based on the vehicle operational state information 101 and/or external information 102 may be applied in order to achieve better noise reductions of the sound input that includes both user speech and cabin noise. Such determinations of which pre-filters to apply to the sound input in order to achieve clearer user speech and better reduce cabin noise from the sound input, may be made based on learned results during the machine learning process.

For example, the machine learning may be configured by the noise reduction tool to analyze the performance of past applications of pre-filter options selected based on received training inputs (e.g., vehicle operational state information 101 and received external information 102). The performance analysis may be based on a speech quality performance measure generated for a resulting sound input that has had the selected noise reduction pre-filters applied. Further description for the generation of the speech quality performance measure is provided below with reference to block 107.

As described earlier, the initial machine learning for developing an initial pre-filter selection strategy may occur during an off-line training period corresponding to a time period when the machine learning is trained on an external computing system. For example, the off-line learning may be accomplished on a computing device such as a personal computer (PC), server (e.g., information server 203 illustrated in FIG. 2), or other computing device capable of receiving past vehicle state data, microphone sound data and noise reduction performance data. However, following the pre-loading of the initial pre-filter selection strategy onto a computing system of the vehicle, the noise reduction tool running on a computing system of the vehicle may implement an on-going machine learning training process during the course of operating the vehicle. For example, FIG. 1 illustrates subsequent machine learning being implemented by the noise reduction tool at 103. The ongoing machine learning to develop improved pre-filter selection strategies may be based on feedback information that includes speech quality performance measurements in view of previously enforced pre-filter selection strategies, the previously selected pre-filters and the corresponding training inputs that caused the pre-filters to be selected.

It follows that by analyzing the speech quality performance measure, the noise reduction tool may learn how the application of certain pre-filters performed in view of the predicted cabin noise sources determined from the training inputs. It follows that going forward, the machine learning may learn to apply different pre-filter options based on the same or different received training inputs. The learned behavior implemented by the machine learning at 103 may be made in accordance to machine learning techniques such as decision tree learning, clustering, neural networks, or other similarly applicable machine learning technique.

The machine learning process at 103 will rely on its learned intelligence and received training inputs to identify and select one or more pre-filters for application on the sound input 105 from the cabin microphone.

For example, a transient removal pre-filter 1 may be selected for removing cabin noise corresponding to road impacts from the sound input 105. The cabin noise due to road impact may be the result of road to tire impact sounds, or sounds from other parts of the vehicle suspension system caused from road impacts. The transient removal pre-filter 1 may correspond to a specific road impact noise recognized at 101. For example, operational state information obtained from a spindle accelerometer may have identified a specific type of road impact at 101 such that the transient removal pre-filter 1 corresponding to the specific type of road impact identified at 101 is selected from the pre-filter options at 104.

Another pre-filter option that may be selected for removing cabin noise is the frequency-weighted noise reduction (NR) pre-filter 2. The frequency-weighted NR pre-filter 2 provides the ability to emphasize specific frequency regions within the sound input 105 for noise reduction. It follows that the vehicle operational state information from 101 may help determine the frequency region most appropriate for noise removal from the sound input 105. For example, at low speeds wind noise is unlikely to be a significant cabin noise factor. Therefore, the emphasis may not be on higher frequency regions (i.e., higher frequency regions correspond to cabin noise caused by wind at high speeds) and rather the frequency-weighted NR pre-filter 2 may be on the lower frequency region for noise removal.

Another pre-filter option that may be selected for removing cabin noise is the engine harmonic pre-filter 3. The engine harmonic pre-filter 3 may be created to reduce, at least in part, cabin noise resulting from the rotational physical operation of the vehicle engine as identified from the vehicle operational state information identified in 101. For example, the engine harmonic pre-filter 3 may be an adaptive notch filter based on an engine rpm value identified from the vehicle operational state for the vehicle engine. The engine rpm value may be used to create a notch filter type of pre-filter that reduces engine harmonics noise within the vehicle cabin. The engine harmonic pre-filter may be created in view of the engine rpm value such that the engine harmonic pre-filter reduces, at least in part, cabin noise resulting from the engine operating at the identified engine rpm value from the sound input 105.

Another pre-filter option that may be selected for removing cabin noise is the road noise pre-filter 4. The road noise pre-filter 4 may be created to reduce, at least in part, recognized road noise that may be part of the cabin noise as identified from the vehicle operational state information identified at 101. For example, the road noise pre-filter 4 may use spindle vibration information from a spindle accelerometer as a reference signal to remove road noise from the sound input 105 signal using a least mean square (LMS) approach in which the spindle input is the reference signal.

Another pre-filter option that may be selected for removing cabin noise is the wind buffeting (non-stationary wind noise) pre-filter 5. The wind buffeting pre-filter 5 may be created to reduce, at least in part, recognized wind noise that may be part of the cabin noise as identified from the vehicle operational state information identified at 101. For example, the HVAC mode or HVAC blower speed operational state information may identify potential cabin noise. In such cases, the creation of the wind buffeting pre-filter 5 may be triggered by the identification of the HVAC mode and/or HVAC blower speed being operational, and further the wind buffeting pre-filter 5 may be created to reduce, at least in part, the wind noise predicted to be within the vehicle cabin due to wind buffeting. In addition, the identification of one or more windows being in one or more down positions may trigger the creation of the wind buffeting pre-filter 5. In such cases, the creation of the wind buffeting pre-filter 5 may serve to reduce, at least on part, cabin noise predicted to be within the vehicle cabin caused by wind buffeting due to the down position of one or more windows from the sound input 105.

Another pre-filter option that may be selected for removing cabin noise is the wind noise pre-filter 6. The wind noise pre-filter 6 may be created to reduce, at least in part, recognized wind noise that may be part of the cabin noise as identified from the vehicle operational state information identified at 101. For example, the wind noise pre-filter may, for example, be a Weiner filter created based on a wind noise spectrum for the specific vehicle. The noise reduction spectra may be mapped based on vehicle speed, such that the wind noise pre-filter 7 selected for removing cabin noise may correspond to a predicted cabin noise caused by wind at a specific vehicle speed identified from the vehicle operational state information at 101. It follows that the wind noise pre-filter 6 serves to reduce, at least in part, predicted wind noise types of cabin noise from the sound input 105 based on vehicle operational state information from 101.

Another pre-filter option that may be selected for removing cabin noise is the HVAC noise pre-filter 7. The HVAC noise pre-filter 7 may be created to reduce, at least in part, recognized steady air flow noise that may be part of the cabin noise as identified from the vehicle operational state information identified at 101. For example, the HVAC pre-filter 7 may be a Weiner filter, where a spectra of frequencies for predicted HVAC noise cabin noise may be mapped based on HVAC mode, HVAC blower speed settings. In this way, the HVAC noise pre-filter 7 may correspond to a specific predicted HVAC cabin noise based on an HVAC mode, or HVAC blower speed, as identified at 101. The HVAC mode or HVAC blower speed operational state information may identify potential HVAC type cabin noise. In such cases, the creation of the HVAC noise pre-filter 7 may be triggered by the identification of the HVAC mode and/or HVAC blower speed being operational, and further the HVAC noise pre-filter 7 may be created to reduce, at least in part, the HVAC noise predicted to be within the vehicle cabin from the sound input 105.

Another pre-filter option that may be selected for removing cabin noise is the car audio removal pre-filter 8. The car audio removal pre-filter 8 may be created to reduce, at least in part, recognized sounds that may be output into the vehicle cabin from the vehicle's car audio system. The car audio system output sounds may be identified from the vehicle operational state information identified at 101 such that the car audio removal pre-filter 8 serves to subtract the identified car audio output sound from the sound input 105 from the cabin microphone. It follows that the car audio removal pre-filter 8 serves to reduce, at least in part, predicted car audio system output types of cabin noise from the sound input 105 based on vehicle operational state information from 101.

The pre-filters described herein are provided for exemplary purposes only, as a greater, or fewer, number of pre-filter options may be available for selection by the noise reduction tool to be applied to the sound input 105.

Then the one or more pre-filters selected by the pre-filter selection strategy at 103 may be applied as pre-filter options at 104 to the sound input 105 received from the cabin microphone.

At 106, a traditional noise reduction filter (e.g., Weiner filter) may additionally be applied to the sound input 105 after applying the one or more pre-filter options at 104. It should be noted that the application of the traditional noise reduction filter at 106 following the application of the one or more pre-filter options at 104 may be optional. In other words, in some embodiments, the traditional noise reduction filter may not be applied to the sound input after applying the one or more pre-filters at 104.

The noise reduction tool may then implement a speech quality performance measure at block 107 on a resultant sound input 105', where the resultant sound input 105' corresponds to the sound input 105 after application of the one or more pre-filter options at 104, and optionally the application of the traditional noise reduction filter at 106.

In some embodiments, the speech quality performance measure may be generated by an external server in communication with the noise reduction tool running on the vehicle. The external server may be similar to the information server 203 illustrated in FIG. 2. For example, the noise reduction tool may cause an interface of the vehicle to transmit the resultant sound input 105' to the external server along with a request to generate the speech quality performance measure. The external server may then receive the speech quality performance measure and request, make a determination of whether to generate the speech quality performance measure in response to receiving the request, generate the speech quality performance measure based on the determination, and transmit the speech quality performance measure back to the noise reduction tool through the interface on the vehicle if the speech quality performance measure was generated. If a determination was made not to generate the speech quality performance measure, the external server may transmit a message back to the noise reduction tool identifying a reason why the speech quality performance measure was not generated (e.g., not enough information to generate a speech quality performance measure). The generation of the speech quality performance measure may be a processor intensive analysis. Therefore, by relying on the external server to generate the speech quality performance measure, the noise reduction tool may conserve processing bandwidth or reserves for one or more processing components of the vehicle. Further, the external server may be better equipped to generate the speech quality performance measure due to the external server including a processor having greater processing capabilities over processors available on the vehicle. Because processors having greater processing capabilities may be more expensive, the noise reduction tool may have been configured to communicate with the external server in order to generate the speech quality performance measure for the resultant input sound 105' to compensate for processors having lower processing capabilities (i.e., cheaper) on the vehicle.

The speech quality performance measure that is generated may gauge a speech quality of the user's speech component within the resultant sound input 105'. For example, the speech quality performance measure may be a MOS (mean opinion score) (e.g., ETSI EG 202 396-3 or ETSI TS 103 106) value of the resultant sound input 105', wherein the MOS value may range from 1 (lowest/worse) to 5 (highest/best). In addition or alternatively, the speech quality performance measure may be a signal-to-noise ratio (SNR) measurement generated in terms of a non-intrusive model that does not require the original speech signal for calculation. For example, the noise reduction tool may generate a SNR measurement in which a voice activity detector (VAD) determines when speech is present in the resultant sound input 105' and calculates energy content for the speech. In the segments when speech is not present, the energy of the noise is determined to provide the SNR estimate. In addition or alternatively, other non-intrusive speech quality performance measures may include techniques such as ITU-T Rec. P.561 (2004) and ITU-T Rec. P.562 that are used to quantify physical characteristics of live call traffic and estimate a Call Clarity Index (ITU-T P.562) and E-model (ITU-T Rec. G.107 (1998)) to assess speech quality. Other non-intrusive techniques may use a priori information to train a machine learning stage (e.g., Gaussian mixture model, neural network, etc.) to quantify the quality of the speech. For these models, a set of known distortions is characterized by several parameters and a relationship between this set of distortions and the perceived speech quality is derived. The machine learning process at 103 can establish these relationships once training has been completed.

It follows that other types of algorithms or processes may be implemented by the noise reduction model to generate the speech quality performance measure of the resultant sound input 105' that identifies a quality of the user's speech from within the resultant sound input 105'.

In some embodiments a baseline speech quality performance measure may be developed from testing enacted before the manufacture of the vehicle on which the hands free phone system is installed. The baseline speech quality performance measure may identify a baseline speech quality of a sound input that is received for use in the hands free phone system. The baseline speech quality performance measure may be stored on a memory that is part of the vehicle system such that the noise reduction tool may reference it. It follows that the speech quality performance measure may be generated at 107 to be in terms of the baseline speech quality performance measure. For example, a speech quality performance measure generated at 107 that is better than the baseline speech quality performance measure may be considered by the noise reduction tool to have been the result of an effective (i.e., positive) noise reduction strategy, where the level of noise reduction effectiveness is in terms of how much better the speech quality performance measure generated at 107 is in terms of the baseline speech quality performance measure. Similarly, a speech quality performance measure generated at 107 that is worse than the baseline speech quality performance measure may be considered by the noise reduction tool to have been the result of a non-effective (i.e., negative) noise reduction strategy, where the level of noise reduction non-effectiveness is in terms of how much worse the speech quality performance measure generated at 107 is in terms of the baseline speech quality performance measure.

In an effort to promote machine learning, the noise reduction tool may feedback at least the speech quality performance measure to the machine learning process at 103 so that the machine learning component may apply machine learning techniques to determine how the application of certain pre-filter options, either individually or in combination with one or more pre-filter options at 104, performed in reducing the cabin noise from the sound input 105 so that the user's speech is enhanced within the resultant sound input 105'. In addition or alternatively, the machine learning process at 103 may receive as feedback information, one or more of the following: the speech quality performance measure for the resultant sound input 105', information identifying the previously selected pre-filter options that resulted in the speech quality performance measure for the resultant sound input 105', and the previously received training inputs that resulted in the selection of the previous pre-filter options that resulted in the speech quality performance measure for the resultant sound input 105'. It follows that this feedback of information provides the machine learning process at 103 of the noise reduction tool with the information needed to apply machine learning techniques to adaptively learn from previous noise reduction strategies.

By feeding back speech quality performance measurements to the machine learning process at 103, the noise reduction tool may be able to better analyze the training inputs going forward to develop an improved pre-filter selection strategy also at 103 that may result in even higher (i.e., better) speech quality performance measurements for improving the user's speech from amongst the cabin noise found in the sound input 105.

This type of adaptive machine learning may be continuously implemented by the noise reduction tool during the operation of the hands free phone system (i.e., while the vehicle is being driven or otherwise in operation), or other types of hands free audio systems, such that the machine learning process at 103 may have access to a growing database of feedback information for analyzing in view of received training inputs. As the database of feedback information continues to grow from continued operation of the hands free phone system and the noise reduction tool, the machine learning process at 103 will be capable of developing an improved pre-filter selection strategy also at 103 that will select pre-filters for achieving better noise reduction in the received sound input 105. In other words, by continuously growing the feedback information identifying the speech quality performance measure, the machine learning will have access to more information which may result in the development of an improved pre-filter selection process that may select the proper pre-filter options in view of the received training inputs for achieving better noise reduction. This allows the noise reduction tool to generate a resultant sound input signal 105' having a clearer user voice component over a cabin noise component. The resultant sound input 105' may then be transmitted to a receiving communications device and output on a speaker of the receiving communications device having a clearer user speech component.

In some embodiments, the machine learning process at 103 may be implemented on an external server in communication with the noise reduction tool running on the vehicle. The external server may be similar to the information server 203 illustrated in FIG. 2. For example, the noise reduction tool may cause an interface of the vehicle to transmit the training input information and the feedback information to the external server along with a request to generate a selection of noise reduction pre-filters to apply to the sound input 105. The external server may then receive the training input information and the feedback information and request, make a determination of which pre-filters to select according to one or more of the methods described herein in response to receiving the request, and transmit a response identifying one or more selected pre-filters back to the noise reduction tool through the interface on the vehicle. The machine learning techniques applied by the machine learning process at 103 may be a processor intensive analysis. Therefore, by relying on the external server to implement the machine learning techniques to select the one or more pre-filters for applying to the sound input 105, the noise reduction tool may conserve processing bandwidth or reserves for one or more processing components of the vehicle. Further, the external server may be better equipped to implement the machine learning techniques due to the external server having a processor with greater processing capabilities over processors available on the vehicle. Because processors having greater processing capabilities may be more expensive, the noise reduction tool may have been configured to communicate with the external server in order to implement the machine learning techniques to compensate for processors having lower processing capabilities (i.e., cheaper) on the vehicle.

Figure 3:
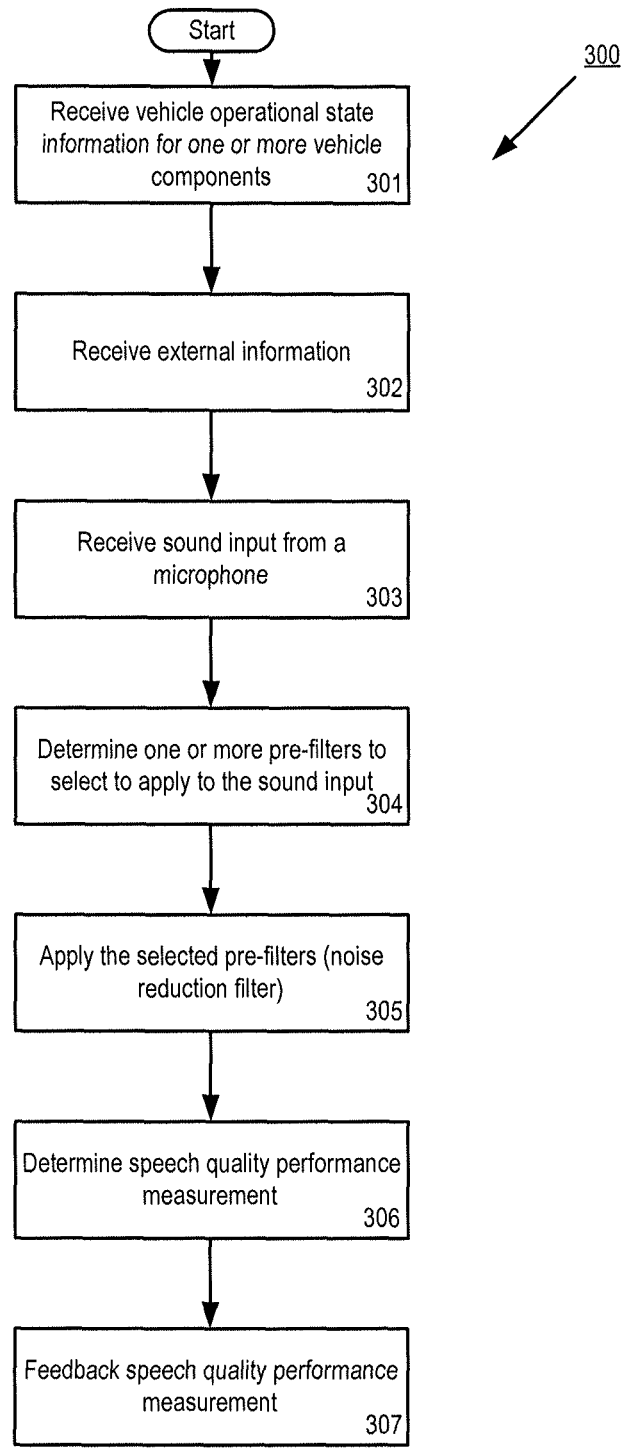
FIG. 3 illustrates an exemplary flow chart describing a process according to some embodiments.

FIG. 3 illustrates an exemplary flow chart 300 describing a process for the noise reduction tool according to some embodiments. The process described by flow chart 300 describes exemplary steps that may be implemented by the noise reduction tool to achieve the adaptive noise reduction described herein. The steps of the process described below is provided for exemplary purposes, as it is within the scope of this disclosure for the noise reduction tool to implement a greater, or fewer, number of steps in order to achieve the adaptive noise reduction of cabin noise described herein. Further description is now provided describing the flow chart 300.

At 301, the noise reduction tool may receive vehicle operational state information for one or more vehicle components, according to one or more of the methods described herein. For example, the noise reduction tool may receive the vehicle operational state information at a machine learning component, according to one or more of the methods described herein. By receiving the vehicle operational state information at 301, the noise reduction tool may identify which vehicle components are currently running or operational, and also identify a specific operational state for a vehicle component (e.g., on or off, running at high, medium, or low, or other operational state).

At 302, the noise reduction tool may receive external information, according to any one or more of the methods described herein. For example, the noise reduction tool may receive the external information at the machine learning component, according to any one or more of the methods described herein. By receiving the external information at 302, the noise reduction tool may identify one or more external conditions that may contribute to cabin noise within the vehicle cabin that may further be picked up by the cabin microphone.

Assuming the hands free phone system is currently running, the cabin microphone may receive a sound input at 303. The sound input may be a combination of a user's speech, as well as cabin noise originating from the operation of vehicle components, passengers, and/or external conditions. The cabin microphone may, for example, pick up the input sound from the vehicle cabin at 303 according to any one or more of the methods described herein.

At 304, the noise reduction tool may determine one or more pre-filters to select for application on the sound input based on a combination of one or more of the vehicle operational state information received at 301, the external information received at 302, and previous machine learning intelligence. For example, the machine learning component of the noise reduction tool may determine the one or more pre-filters to apply to the sound input according to any one or more of the methods described herein.

At 305, the noise reduction tool may apply the one or more pre-filters selected at 304 to the sound input. The one or more pre-filters may, for example, be applied to the sound input according to any one or more of the methods described herein. In addition, in some embodiments a traditional noise reduction filter may be applied after the application of the pre-filters. The traditional noise reduction filter may be, for example, a Weiner filter.

At 306, the noise reduction tool may determine a speech quality performance measure for the sound input resulting after the application of the pre-filters (and optionally the traditional noise reduction filter) at 305. The determination of the speech quality performance measure for the resulting sound input may, for example, may be determined according to any one or more of the methods described herein. The speech quality performance measure may be stored on a memory of the vehicle as feedback data.

At 307, the speech quality performance measure may be provided back to the noise reduction tool via a feedback loop in order to promote adaptive machine learning to promote better noise reduction strategies. For example, the feedback loop may provide the speech quality performance measure back to the machine learning component of the noise reduction tool according to any one or more method described herein.

It should be noted that the process described by flow chart 300 is provided for exemplary purposes, and it is within the scope of the innovation described herein for the noise reduction tool to implement a process for adaptive noise reduction that includes a greater, or fewer, number of steps. For example, although not expressly illustrated in FIG. 3, the resultant sound input following step 305 may be transmitted to a phone that is at the other end of the call conversation with the phone linked to the hands free phone system.

Figure 4:
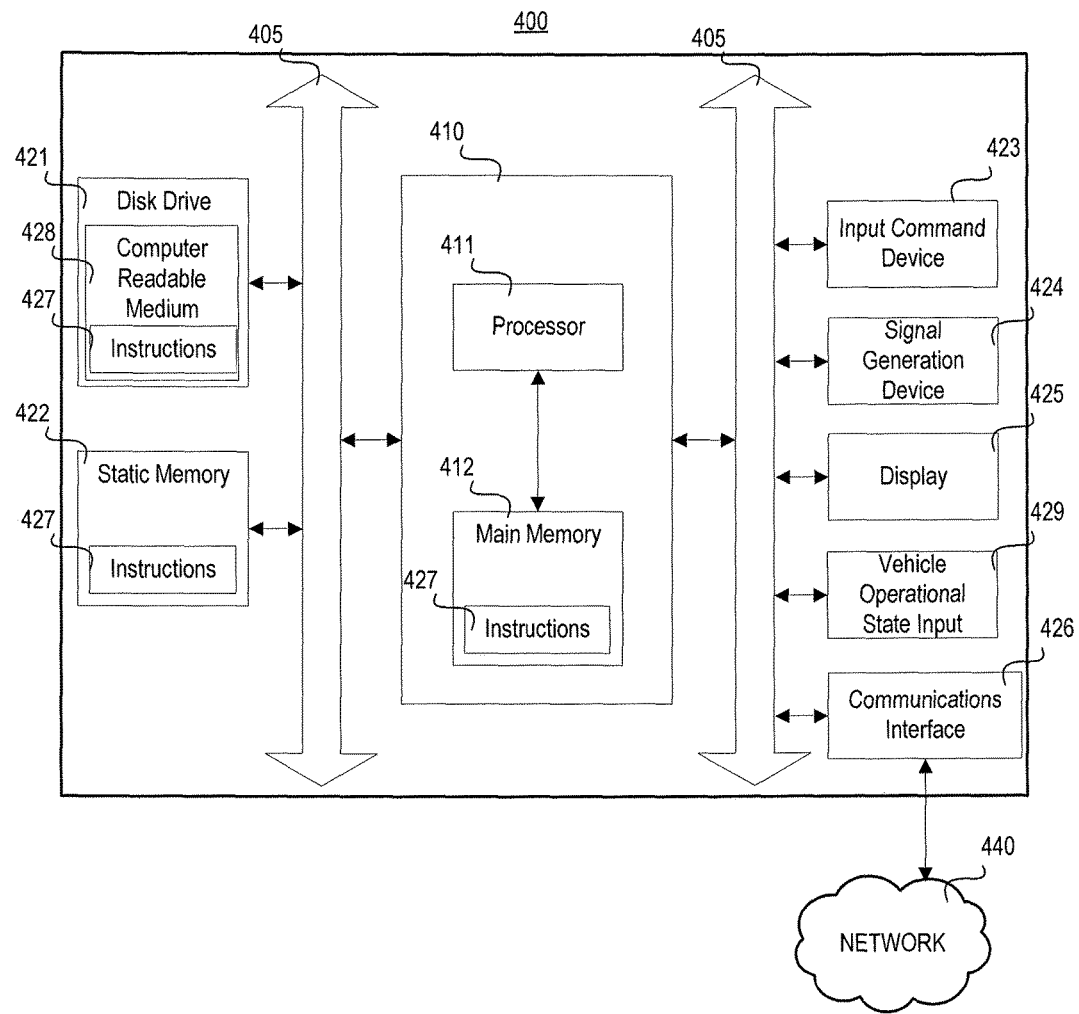
FIG. 4 illustrates an exemplary block diagram for a computing system that may be part of a vehicle system according to some embodiments.

Referring to FIG. 4, an illustrative embodiment of a computing system 400 that may be used for one or more of the devices shown in FIG. 2, or in any other system configured to carry out any one or more of the methods, features, and processes discussed herein, is shown and designated by the computing system 400. For example, the functional components of the vehicle (e.g., vehicle 202) described herein needed to implement the noise reduction tool may be implemented as the computer system 400. Also, the information server 203 illustrated in FIG. 2 may be implemented as the computing system 400.

The computing system 400 may include a processing unit 410 comprised of a processor 411 in communication with a main memory 412, wherein the main memory 412 stores a set of instructions 427 that may be executed by the processor 411 to cause the computing system 400 to perform any one or more of the methods, processes or computer-based functions disclosed herein. For example, the noise reduction tool described throughout this disclosure may be a program that is comprised of the set of instructions 427 that are executed to perform any one or more of the methods, processes or computer-based functions described herein such as the processes for achieving the noise reduction applied to a sound input picked up by the cabin microphone of the hands free phone system described herein. This includes the machine learning processes implemented by the noise reduction tool described herein. The computing system 400 may be mobile or non-mobile, operate as a stand-alone device, or may be connected using a network, to other computer systems or peripheral devices.

In a networked deployment, the computing system 400 may operate in the capacity of a server or as a client user computer within a vehicle in a server-client user network environment, or as a peer computer system within a vehicle in a peer-to-peer (or distributed) network environment. In addition to being a component within the vehicle system, the noise reduction tool may also be run on the computing system 400 that is implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computing system 400 can be implemented using electronic devices that provide voice, video or data communication. Further, while a single computing system 400 is illustrated, the term "system" shall also be taken to include any collection of systems or sub-systems that individually or jointly execute a set, or multiple sets, of instructions to perform one or more computer functions.

As illustrated in FIG. 4, the computing system 400 may include the processor 411, such as a central processing unit ("CPU"), a graphics processing unit ("GPU"), or both. It follows that the processor 411 may be representative of one or more processing units. Moreover, the computing system 400 can include the main memory 412 and a static memory 422 that can communicate with each other via a bus 405. As shown, the computing system 400 may further include a display unit 425, such as a liquid crystal display ("LCD"), an organic light emitting diode ("OLED"), a flat panel display, a solid state display, or a cathode ray tube ("CRT"). The display unit 425 may correspond to a display component of a navigation system, vehicle infotainment system, a heads-up display, or instrument panel of the vehicle (e.g., vehicle 202) described herein. Additionally, the computing system 400 may include one or more input command devices 423, such as a control knob, instrument panel, keyboard, scanner, digital camera for image capture and/or visual command recognition, touch screen or audio input device (e.g., cabin microphone), buttons, a mouse or touchpad. The computing system 400 can also include a disk drive unit 421 for receiving a computer readable medium 428. In a particular embodiment, the disk drive unit 421 may receive the computer-readable medium 428 in which one or more sets of instructions 427, such as the software corresponding to the noise reduction tool, can be embedded. Further, the instructions 427 may embody one or more of the methods or logic as described herein. In a particular embodiment, the instructions 427 may reside completely, or at least partially, within any one or more of the main memory 412, the static memory 422, computer readable medium 428, and/or within the processor 411 during execution of the instructions 427 by the processor 411.

The computing system 400 may also include a signal generation device 424, such as a speaker or remote control, and a vehicle operational state interface 429. The vehicle operational state interface 429 may be configured to receive information related to an operational state for various vehicle components that comprise the vehicle system. For example, the vehicle system may include one or more power windows, an engine, windshield wipers, turn signals, car audio system, HVAC system, suspension system, and other components with the potential of adding to cabin noise.

The computing system 400 may further include a communications interface 426. The communications interface 426 may be comprised of a network interface (either wired or wireless) for communication with an external network 440. The external network 440 may be a collection of one or more networks, including standards-based networks (e.g., 2G, 3G, 4G, Universal Mobile Telecommunications System (UMTS), GSM® Association, Long Term Evolution (LTE) ™, or more), WiMAX, Bluetooth, near field communication (NFC), WiFi (including 802.11a/b/g/n/ac or others), WiGig, Global Positioning System (GPS) networks, other telecommunications networks and others available at the time of the filing of this application or that may be developed in the future. Further, the network 440 may be a public network, such as the Internet, a private network, such as an intranet, or combinations thereof, and may utilize a variety of networking protocols now available or later developed including, but not limited to TCP/IP based networking protocols. For example, the external network 440 may correspond to the same network 201 described with reference to FIG. 2.

In some embodiments the program that embodies the noise reduction tool may be downloaded and stored on any one or more of the main memory 412, computer readable medium 428, or static memory 422 via transmission through the network 440 from an off-site server. Further, in some embodiments the noise reduction tool running on the computing system 500 may communicate with an information server via the network 440. For example, the noise reduction tool may communicate with the information server 203 via network 440 in order to receive any one or more of the external information described herein through the communication interface 426.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by the computing system 400. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories, such as flash memory. Further, the computer-readable medium can be a random access memory or other volatile re-writable memory. Additionally, the computer-readable medium can include a magneto-optical or optical medium, such as a disk or tapes or other storage device to capture information communicated over a transmission medium. Accordingly, the disclosure is considered to include any one or more of a computer-readable medium or a distribution medium and other equivalents and successor media, in which data or instructions may be stored.

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A system comprising:
   (i) a vehicle comprising:
      (a) a microphone configured to capture audio;
      (b) a memory configured to store a Weiner filter and a database including a plurality of predetermined discrete prefilters and a plurality of selection strategies, each selection strategy referencing at least one prefilter;
      (c) processor(s) in communication with the memory, the processor(s) configured to, while a hands free phone system is operating:
         receive vehicle operational state(s), external information, and feedback data;
         select at least one of the selection strategies from the database based on the vehicle operational state(s), the external information, and the feedback data;
         apply the prefilter(s) referenced by the selected selection strategy to the captured audio;
         apply the Weiner filter to the prefiltered audio; and
         update the selected selection strategy based on an analysis; and
   (ii) server(s) configured to:
      generate the analysis by analyzing a quality of the Weiner filtered audio to change the stored selection strategy while the hands free phone system is operating;
      segment the Weiner filtered audio into first segments determined to include human speech and into second segments determined to lack human speech; and
      analyze the quality of the Weiner filtered audio by comparing at least one of the first segments to at least one of the second segments.

2. The system of claim 1, wherein the processor(s) are configured to transmit the Weinder filtered audio, but not the prefiltered audio to the server(s).

3. The system of claim 1, wherein the at least one of the selection strategies is at least first one of the selection strategies, and wherein the vehicle comprises a motor that drives wheels, and the processor(s) are configured to:
   determine a motor running state;
   select at least second one of the selection strategies based on the determined motor running state;
   retrieve the prefilter(s) referenced by the at least second one of the selected selection strategies from a database; and
   select and apply the Weiner filter without reference to the determined motor running state.

4. The system of claim 3, wherein the motor running state is a rotational speed of the motor.

5. The system of claim 1, wherein the at least one of the selection strategies is at least first one of the selection strategies, and wherein the vehicle comprises an accelerometer configured to sense an acceleration, and the processor(s) are configured to:
   select at least second one of the selection strategies based on the sensed acceleration; and
   retrieve the prefilter(s) referenced by the at least second one of the selected selection strategies from a database.

6. The system of claim 1, wherein the selection strategies causes the processor(s) to:

configure the selected prefilter(s) to filter a first frequency region of the sound, but not filter a second frequency region of the sound.

7. The system of claim 2, wherein the vehicle includes audio output speakers, and the selection strategies cause the processor(s) to:
select prefilter(s) that subtract the audio output from the captured audio.

8. The system of claim 1, wherein the processor(s) are configured to: update the selection strategies based on the analysis, the applied prefilter(s), and inputs that caused the selection strategies to select the applied prefilter(s).

9. The system of claim 1, wherein the vehicle comprises a moveable seat and the processor(s) are configured to:
select the selection strategy based on a detected current position of the moveable seat; and
retrieve the prefilter(s) referenced by the selected selection strategy from a database.

10. The system of claim 1, comprising a mobile phone in wireless communication with the vehicle and wherein the processor(s) are configured to: transmit the Weiner filtered audio to the mobile phone and the server(s).

11. A method of controlling a system, the system comprising: (a) a vehicle comprising a microphone configured to capture audio and processor(s), and (b) server(s), the method comprising, via the processor(s):
receiving training input data and feedback data;
selecting a stored selection strategy based on the training input data and the feedback data, the selection strategy referencing stored predetermined discrete prefilter(s);
applying the prefilter(s) referenced by the selected selection strategy to the captured audio;
selecting and applying a Weiner filter to the prefiltered audio without reference to the selected selection strategy;
updating, during a current use of a hands free phone system, the stored selection strategy based on an analysis;
the method further comprising, via the server(s):
generating the analysis by analyzing a quality of the Weiner filtered audio based on sound quality measurements taken during the current use of the hands free phone system;
segmenting the Weiner filtered audio into first segments determined to include human speech and into second segment determined to lack human speech; and
analyzing a quality of the Weiner filtered audio by comparing at least one of the first segments to at least one of the second segments.

12. The method of claim 11, comprising: transmitting the Weiner filtered audio, but not the prefiltered audio to the servers such that the generated analysis is based on the quality of Weiner filtered audio received from the vehicle and not a quality of prefiltered audio received from the vehicle.

13. The method of claim 12, wherein the vehicle comprises a moveable seat and the method comprises:
selecting the selection strategy based on a detected current position of the moveable seat; and
retrieving the prefilter(s) referenced by the selected selection strategy from a database.

14. The method of claim 13, comprising: based on the stored selection strategy, configuring the selected prefilter(s) to filter a first frequency region of the sound, but not filter a second frequency region of the sound.

15. The method of claim 14, wherein the system comprises a mobile phone in wireless communication with the vehicle and the method comprises:
updating the stored selection strategy based on the analysis, the applied prefilter(s), and inputs that caused the stored selection strategy to select the applied prefilter(s); and
transmitting the Weiner filtered audio to the mobile phone and the server(s).

16. The system of claim 1, wherein the external information are not provided by the microphone.

17. The system of claim 1, wherein the external information includes geographic information, and
wherein the geographic information is obtained by a global positioning system (GPS) for a route being traveled by the vehicle.

18. The system of claim 1, wherein the server(s) is further configured to provide the external information.

* * * * *